United States Patent
Horvath et al.

(10) Patent No.: US 8,522,077 B2
(45) Date of Patent: Aug. 27, 2013

(54) POWER SUPPLY GRID SWITCH

(75) Inventors: Stephen Ejner Horvath, Roseville, CA (US); Sean Cerniglia, Cool, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 381 days.

(21) Appl. No.: 12/913,560

(22) Filed: Oct. 27, 2010

(65) Prior Publication Data
US 2012/0110350 A1    May 3, 2012

(51) Int. Cl.
*G06F 11/00*    (2006.01)
(52) U.S. Cl.
USPC .................................. 714/14; 714/22; 307/80
(58) Field of Classification Search
USPC ....................................................... 714/22, 14
See application file for complete search history.

(56) References Cited

U.S. PATENT DOCUMENTS

| | | | |
|---|---|---|---|
| 6,654,265 B2 * | 11/2003 | Sadler et al. | 363/65 |
| 6,747,369 B2 * | 6/2004 | Griffith et al. | 307/43 |
| 7,222,248 B2 * | 5/2007 | Blanco et al. | 713/300 |
| 7,586,211 B2 | 9/2009 | Loffink et al. | |
| 7,721,122 B2 * | 5/2010 | Brundridge | 713/300 |
| 8,200,370 B2 * | 6/2012 | Paik | 700/291 |
| 2003/0048647 A1 * | 3/2003 | Sadler et al. | 363/65 |
| 2008/0168282 A1 * | 7/2008 | Brundridge | 713/300 |
| 2009/0031307 A1 * | 1/2009 | Chodroff et al. | 718/100 |
| 2010/0141038 A1 | 6/2010 | Chapel et al. | |
| 2010/0308857 A1 * | 12/2010 | Saniter et al. | 324/764.01 |
| 2011/0025300 A1 * | 2/2011 | Ahmed et al. | 324/119 |
| 2011/0118862 A1 * | 5/2011 | Boss et al. | 700/100 |
| 2012/0068540 A1 * | 3/2012 | Luo et al. | 307/48 |
| 2012/0166009 A1 * | 6/2012 | Boss et al. | 700/295 |

* cited by examiner

*Primary Examiner* — Kamini Patel

(57) ABSTRACT

Examples relate to a grid switch adapted for use with a power supply, wherein the grid switch selects an operational power grid from first and second power grids if one of power grids has failed, and selects between the first and second grids based on a policy if both the first and second power grids are operational.

17 Claims, 5 Drawing Sheets

POWER SUPPLY GRID SWITCH

BACKGROUND

In the art of computing, power is supplied to a computer system. It is desirable to provide redundancy so that the computer system may continue to operate should a power supply fail. One type of redundancy known in the art is N+1 redundancy, which provides one more power supply than the number of power supplies necessary to meet the power requirements of the computer system. If one of the N+1 power supplies fails, operation can continue with the remaining N power supplies until the failed power supply can be replaced.

In data centers, it is common to provide two power grids, and provide both power grids to data center computer systems to provide power grid redundancy. Should one power grid fail, operation of the computer systems in the data center can continue with the other power grid.

BRIEF DESCRIPTION OF THE DRAWINGS

The Figures depict examples, implementations, and configurations.

DETAILED DESCRIPTION

Figure 1:
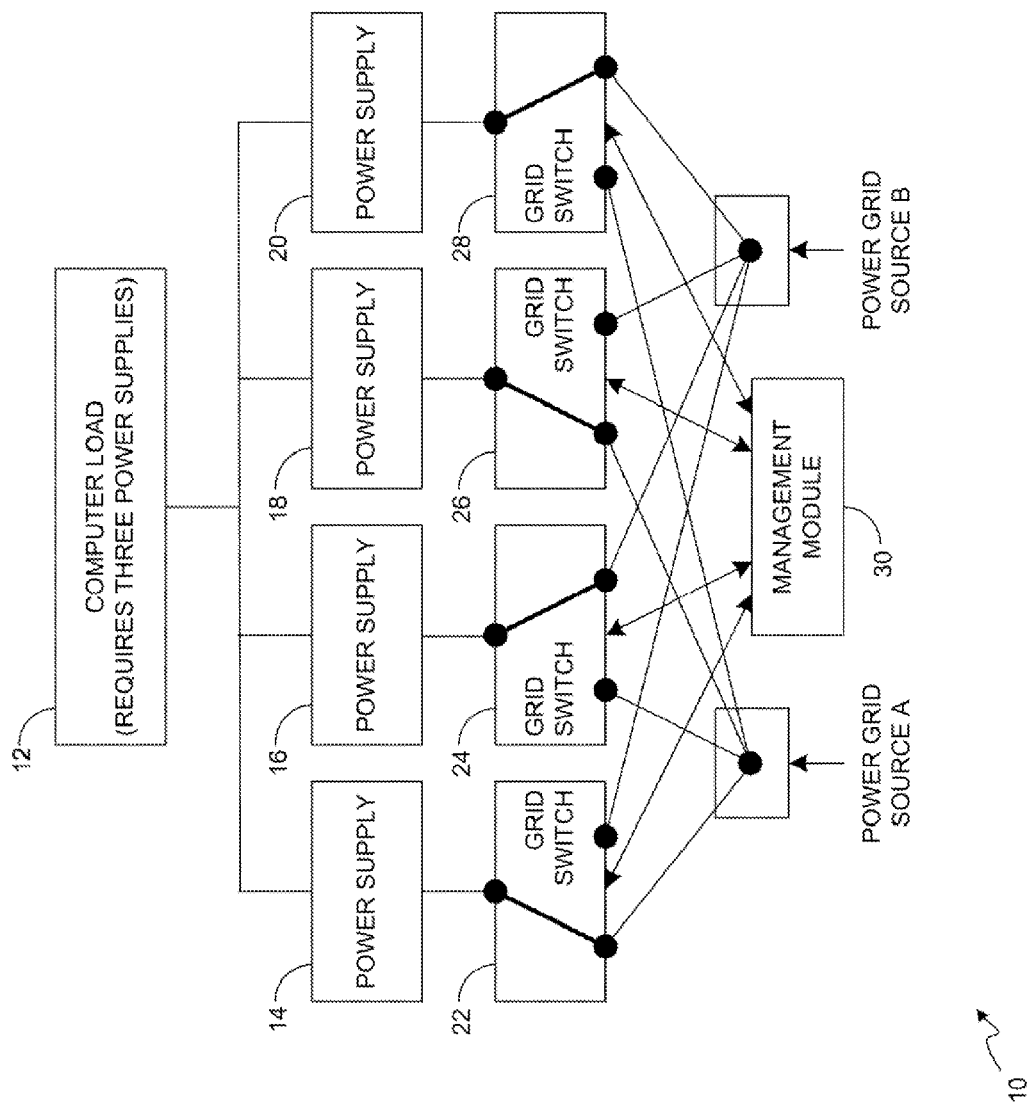
FIG. 1 shows a power redundancy configuration that provides full N+1 power supply redundancy for a computer load and power grid redundancy from power grid sources A and B.

In the foregoing description, numerous details are set forth to provide an understanding of the examples. However, it will be understood by those skilled in the art that the examples may be practiced without these details. While a limited number of examples have been disclosed, those skilled in the art will appreciate numerous modifications and variations therefrom.

Examples relate to a power supply grid switch provided for each power supply in a computer system. Each grid switch is capable of autonomous operation. By providing a power supply grid switch for each power supply, full N+1 power supply redundancy and power grid redundancy may be achieved while eliminating single failure points capable of interfering with continued operation of the computer system, and minimizing the number of power supplies required.

As discussed in the Background section above, it is desirable to provide power supply redundancy so that a computer system may continue operating after a single power supply has failed. However, it is also desirable to provide power grid redundancy so that the computer system may continue to operate after a power grid has failed.

One configuration known in the art to achieve both power supply redundancy and power grid redundancy using typical power supplies is to provide N+N redundancy. If N power supplies are required to power a computer system, then N power supplies are provided for each power supply grid. If one of the power grids fails, there are still N power supplies connected to the other grid. Furthermore, if one of the power supplies fails, there is at least one redundant power supply available, provided both power grids are operating.

One advantage of N+N redundancy is that there is not a single point of failure that will cause the computer system to stop operating. Also, this configuration is capable of sharing the power load between the two power grids. However, for large values of N, additional power supplies are required compared to N+1 redundancy. For example, for N=3, N+1 redundancy requires four power supplies, and N+N redundancy requires six power supplies. Another disadvantage of N+N redundancy is that it does not accommodate certain simultaneous failures. For example, if a power grid fails, the configuration cannot tolerate a failure of one of the remaining N power supplies. Furthermore, if a single power supply fails, the configuration cannot tolerate the failure of a power grid.

Another common configuration for use with typical power supplies is to provide N+1 power supply redundancy along with a single grid transfer switch. All power supplies are connected to the grid transfer switch, and the grid transfer switch switches, to one power grid if the other power grid fails. This configuration has the advantage accommodating simultaneous failures of a power supply and a power grid, and may reduce the number of power supplies required compared to an N+N configuration. However, operation of the computer system is dependent on the grid transfer switch, so the grid transfer switch is a single failure point capable of interrupting operation of the computer system. Furthermore, this configuration does not provide any opportunities for sharing the power load between the two power grids.

FIG. 1 shows a power redundancy configuration 10 that provides full N+1 power supply redundancy for computer load 12 and power grid redundancy from power grid sources A and B. In this example, computer load 12 requires three power supplies (N=3), so four power supplies 14, 16, 18, and 20 are provided. Each power supply is coupled to a grid switch. Accordingly, power supply 14 is coupled to grid switch 22, power supply 16 is coupled to grid switch 22, power supply 18 is coupled to grid switch 26, and power supply 20 is coupled to grid switch 28.

Power redundancy configuration 10 provides the advantages of both configurations discussed above with typical power supplies, while minimizing the number of power supplies required. There is no single point of failure. Any single power grid can fail, and a single grid switch or any single power supply can fail, and configuration 10 will continue to meet the power requirements of computer load 12. Furthermore, configuration 10 can tolerate certain simultaneous failures. For example, if a power grid source fails, any single grid switch or power supply can also fail, and configuration 10 will continue to meet the power requirements of computer load 12.

As will be discussed in greater detail below, the grid switches are capable of autonomous operation. In one example, a grid switch will default to autonomous operation whenever a power grid source fails. When both power grid sources are functioning, the grid switches may operate autonomously, or may operate under control of management module 30. The ability to control the grid switches from management module 30 provides additional opportunities to balance loads between power grid sources, test power paths through power grid sources, grid switches, and power supplies, and configure power grid usage when one a power grid requires servicing.

Management module 30 may be implemented by, a computer system represented by computer load 12, a service processor associated with a computer system or a server rack, or a data center management computer.

Figure 2:
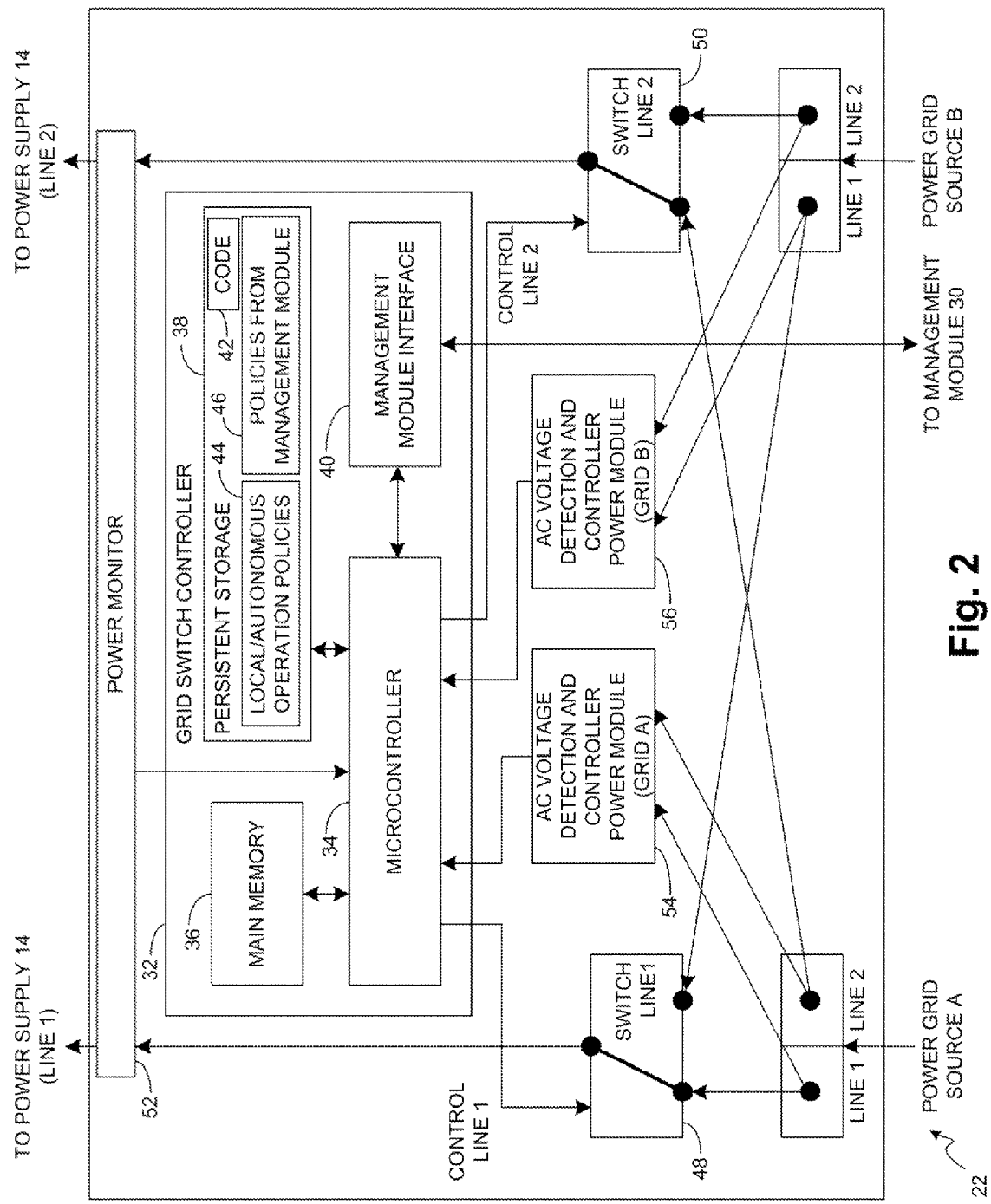
FIG. 2 shows a grid switch shown in FIG. 1.

FIG. 2 shows grid switch 22 of FIG. 1. Grid switches 24, 26, and 28 are substantially similar. Grid switch 22 includes grid switch controller 32, which includes microcontroller 34, main memory 36, persistent storage 38, and management module interface 40. Persistent storage 38 includes code 42 that operates grid switch 22 via execution on microcontroller 34, local/autonomous operation policies 44, and policies from management module 30. Management module interface 40 represents any suitable interface to couple grid switch 22 to management module 30, such as an RS-232 serial interface, an Ethernet interface, an I$^2$C interface, a universal serial bus (USB) interface, and the like. Although individual components are shown in grid switch controller 32, note that grid switch controller 32 may be provided in a single integrated circuit (IC) microcontroller. Many commercially available microcontrollers include a processing core, main memory, persistent storage in the form of flash memory, and interfaces such as single bit inputs, single bit control outputs, and interfaces such as RS-232, Ethernet, I$^2$C, and USB interfaces in a single package, such as a microcontroller based on an ARM core.

Grid switch 22 in FIG. 2 is shown supporting single-phase power. Accordingly, two lines (line 1 and line 2) are provided for each power grid source (A and B). Those skilled the art will recognize that multi-phase power sources may be supported by providing additional lines and switches. In addition, ground connections may be routed through grid switch 22. The ground connections are not shown in FIG. 2.

Switch 48 switches between line 1 of power grid source A and line 1 of power grid source B, and is controlled by control line 1 from microcontroller 34 of grid switch controller 32. Similarly, switch 50 switches between line 2 of power grid source A and line 2 of power grid source B, and is controlled by control line 2 from microcontroller 34 of grid switch controller 32. Control lines 1 and 2 may be implemented by single bit control outputs of microcontroller 34, along with appropriate buffering. Switches 48 and 50 may be implemented by mechanical relays, or solid-state switches, such as triacs.

The outputs of switches 48 and 50 are provided to power monitor 52, which monitors power flowing through grid switch 22 and provides an indication of power usage to microcontroller 34 of grid switch controller 32. From power monitor 52, lines 1 and 2 are provided to power supply 14 in FIG. 1. As shown in FIG. 1, the couplings from grid switches 24, 26, and 28 to power supplies 16, 18, and 20, respectively, are substantially similar.

AC voltage detection and controller power module 54 is coupled to lines 1 and 2 of power grid source A, and AC voltage detection and controller power module 56 is coupled to lines 1 and 2 of power grid source B, with the outputs of each module provided to microcontroller 34 of grid switch controller 32. Modules 54 and 56 may be implemented as simple power supplies, with signal-level outputs of modules 54 and 56 provided to single bit inputs of microcontroller 34. Furthermore, the outputs of modules 54 and 56 may be configured into a simple current sharing configuration to provide power to grid switch 22. In such a configuration, grid switch 22 will receive power if either or both power grid sources A and B are operational. The current sharing configuration is not shown in FIG. 2, but may be easily implemented using techniques known in the art. Accordingly, modules 54 and 56 allow grid switch controller 32 to monitor the status of each power grid source, and provide power redundancy to the circuits implementing grid switch 22.

Figure 3:
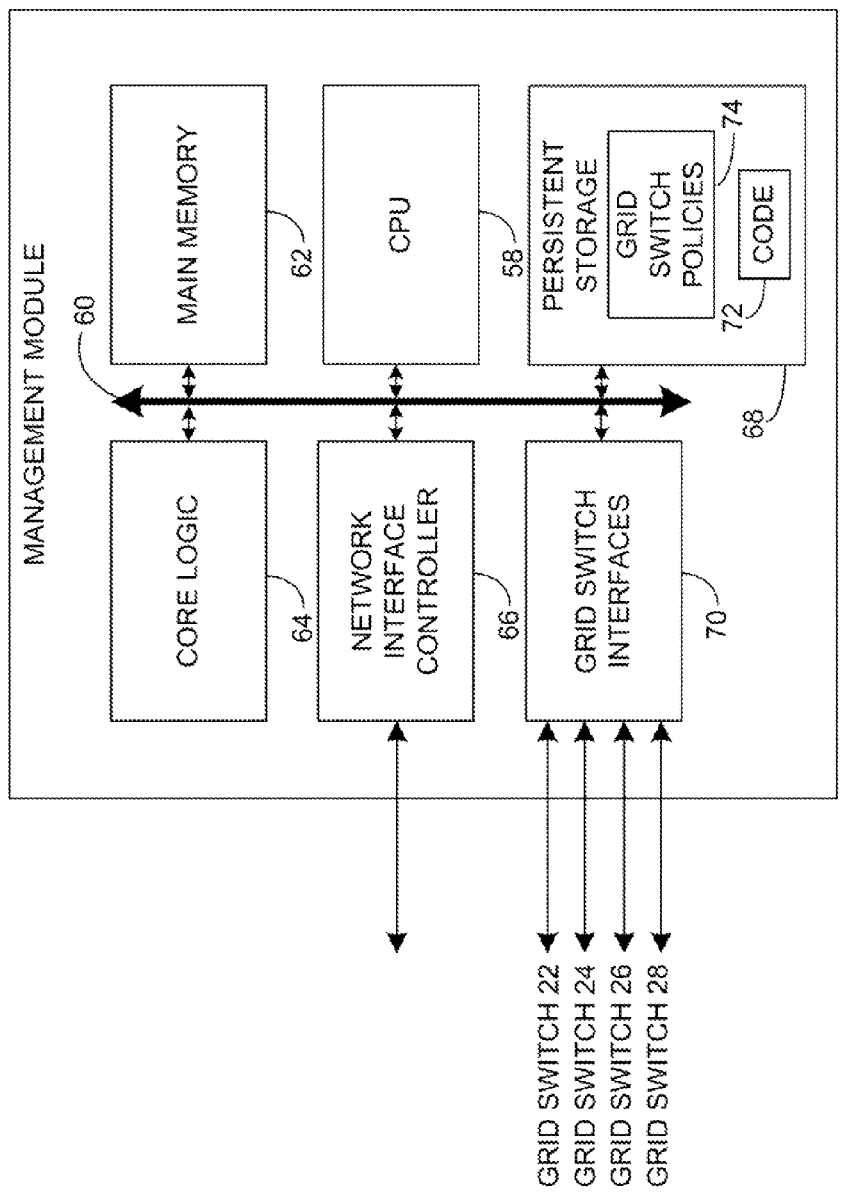
FIG. 3 shows a management module in the form of a generic computer.

FIG. 3 represents management module 30 in the form of a generic computer. Management module 30 includes central processing unit (CPU) 58 coupled to bus 60. Also coupled to bus 60 are main memory 62, core logic 64, network interface controller 66, persistent storage 68, and grid switch interfaces 70. Persistent storage 68 includes code 72 that is executed by CPU 58 to operate management module 30, and grid switch policies 74 that may be transmitted to grid switches 22, 24, 26, and 28 via grid switch interfaces 70. As discussed above, the grid switch interface may be implemented as an RS-232 serial interface, an Ethernet interface, an I2C interface, a universal serial bus (USB) interface, or any other suitable interface known in the art. Network interface controller 66 represents a local area connection to, other computers, core logic 64 represents various core logic ICs and controllers known in the art, and main memory 62 is used by CPU 58 to store data and code executed by CPU 58.

Figure 4:
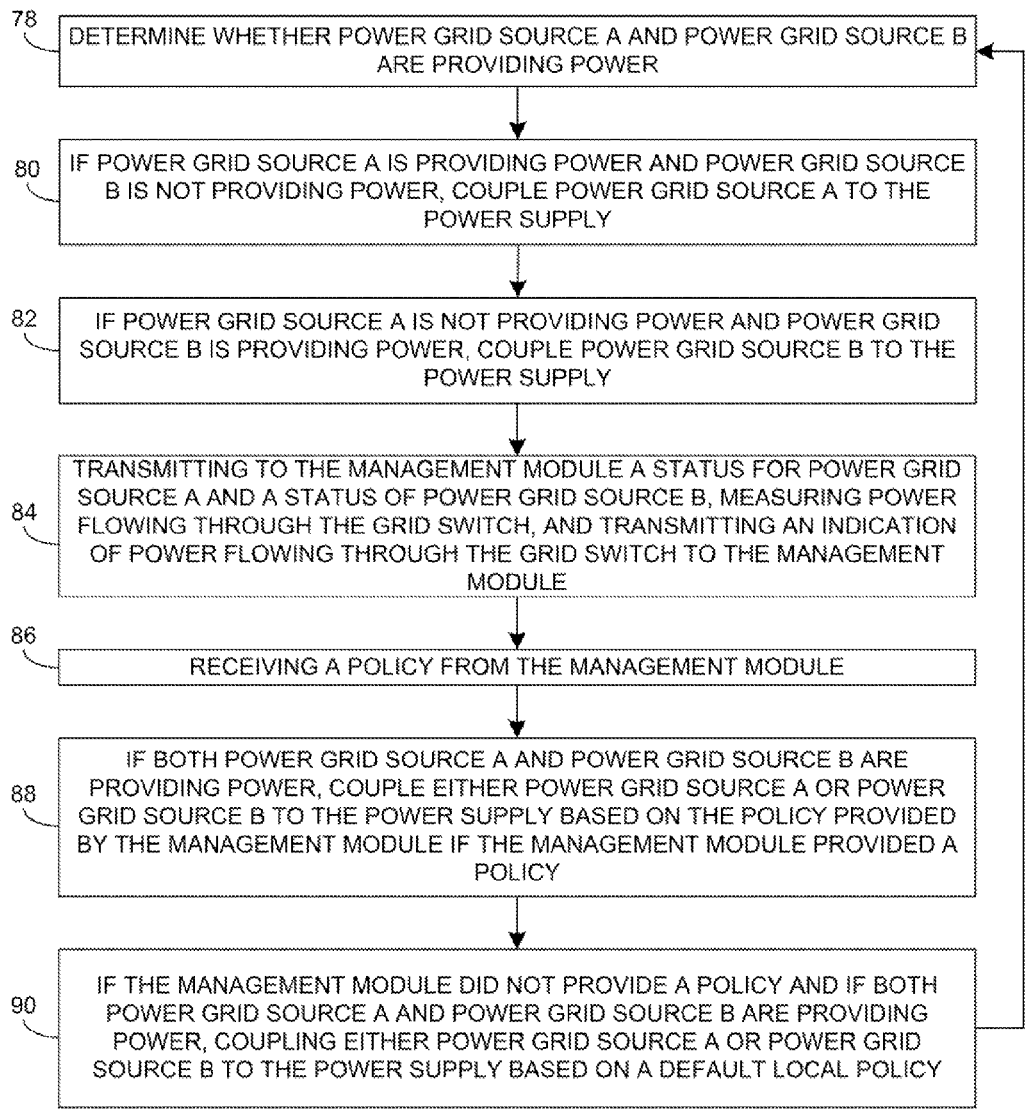
FIG. 4 shows a flow chart that illustrates an operational method for the grid switch shown in FIGS. 1 and 2.

FIG. 4 shows a flow chart 76 that illustrates an operational method for grid switch 22. An operational method for grid switches 24, 26, and 28 would be substantially similar. At block 78, grid switch 22 determines whether power grid source A and power grid source B are providing power. Control passes to block 80.

At block 80, if power grid source A is providing power and power grid source B is not providing power, grid switch 22 couples power grid source A to power supply 14. Control passes to block 82. At block 82, if power grid source A is not providing power and power grid source B is providing power, grid switch 22 couples power grid source B to power supply 14. Control passes to block 84.

At block 84, grid switch 22 transmits to management module 30 a status for power grid source A and a status for power grid source B, as determined in block 78. Should a grid switch detect that a power grid is not functioning, the grid switch can alert management module 30 so that the management module can alert a technician to service a failed power grid. Block 84 also measures power flowing through grid switch 22 and provides an indication of power flowing through grid switch 22 to management module 30. Management module 30 may use power flow measurements from multiple grid switches to develop individual grid switch control policies to provide balancing and load sharing between power grid sources A and B. Control passes to block 86. A lack of power flowing through a grid switch may also be indicative of a failed power supply.

At block 86, a policy is received from management module 86. Several policies will be discussed below with reference to FIG. 5. Control passes to block 86.

At blocks 80 and 82, grid switch 22 operates autonomously to select a functioning power grid source if one of the power grid sources has failed. However, if both power grid sources are functioning, then grid switch 22 may select a power grid switch based on a policy. Block 88 implements a policy provided by management module 30 if management module 30 provided a policy. Control passes to block 90, and block 90 implements a default local policy if management module 30 did not provide a policy. A policy may not be provided by management module 30 if for example, the interface to management module 30 or management module 30 itself has failed, or if grid switch 22 is deployed autonomously without a connection to a management module. Control loops back to block 78, and the operational method repeats.

Figure 5:
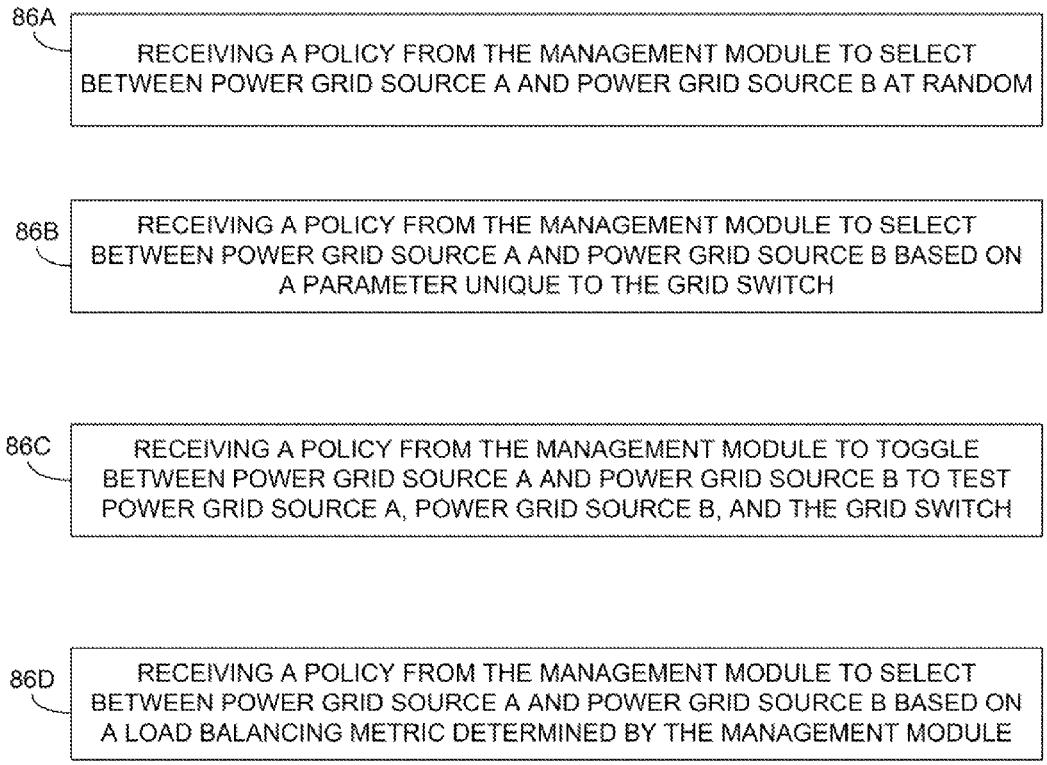
FIG. 5 illustrates several difference policies that may be received at a block in the flowchart of FIG. 4.

FIG. 5 illustrates several different policies that may be received at block 86 in FIG. 4. At block 86A, a policy is received from management module 30 to select between power grid source A and power grid source B at random.

At block 86B, a policy is received from management module 30 to select between power grid source A and power grid source B based on a parameter unique to the grid switch. For example, grid switch 22 may have a serial number stored in persistent storage 38 or associated with microcontroller 34. If management module interface 40 is implemented as an Ethernet connection, a unique MAC address is associated with the Ethernet connection. Similarly, unique parameters are associated with USB connections and I²C connections. If the grid switch is implemented as a module that is inserted into a slot, there may be a unique parameter associated with the slot. A function to convert the parameter to a power grid source choice could be as simple as an even/odd determination, or a more complex function may be used.

Block 86C receives a policy from management module 30 to toggle between power grid source A and power grid source B to test both power grid sources and the grid switch. A suitable test interval may be used, such as toggling the power grid source hourly, daily, or weekly. In the event that one of the power grid sources has failed, the functioning power grid source will be selected by execution of block 80 and 82 in FIG. 4, and the failure will be reported to the management module at block 84.

Block 86D receives a policy from the management module to select between power grid source A and power grid source B based on a load balancing metric determined by management module 30. In FIG. 4, block 88 reports power flowing, through grid switch 22 to management module 30. Management module 30 may compile power measurements from many grid switches, and in turn control the grid switches to balance overall power usage between the power grid sources.

Of course, another policy is to always select power grid source A or power grid source B. However, in redundant configurations, it is often desirable to use all hardware for load balancing and to continuously test all hardware, so it may be appropriate to select a policy that selects different power supply grids from grid switch to grid switch, and occasionally toggles grid switches.

Note that in block 90 of FIG. 4, a default local policy is implemented if a policy was not received from management module 30. The policies discussed with reference to blocks 86A and 86B, along with always selecting power grid source A or B, are appropriate default local policies for use in block 90.

In the examples discussed above, a power supply grid switch is provided for each power supply in a computer system. Each grid switch is capable of autonomous operation. The grid switches discussed above may be implemented at low cost, and allow typical power supplies to provide full N+1 power supply redundancy and power grid redundancy while eliminating single failure points capable of interfering with continued operation of the computer system, minimizing the number of power supplies required, and accommodating certain classes of simultaneous failures.

In the foregoing description, numerous details are set forth to provide an understanding of the examples. However, it will be understood by those skilled in the art that the examples may be practiced without these details. While a limited number of examples have been disclosed, those skilled in the art will appreciate numerous modifications and variations therefrom. It is intended that the appended claims cover such modifications and variations as fall within the true spirit and scope of the examples.

What is claimed is:

1. A method of operating a grid switch coupled to a power supply and first and second power grids comprising:
   determining whether the first and the second power grids are providing power;
   if the first power grid is providing power and the second power grid is not providing power, coupling the first power grid to the power supply;
   if the first power grid is not providing power and the second power grid is providing power, coupling the second power grid to the power supply;
   if both the first and second power grids are providing power, coupling either the first or second power grid to the power supply based on a policy provided by a management module if the management module provided the policy;
   measuring power flowing through the grid switch;
   transmitting an indication of power flowing through the grid switch to the management module; and
   receiving from the management module a policy to switch to either the first or second power grids based on a load balancing metric determined by the management module.

2. The method of claim 1 and further comprising:
   receiving from the management module a policy to select between the first and second power grids at random.

3. The method of claim 1 and further comprising:
   receiving from the management module a policy to select between the first and second power grids based on a parameter unique to the grid switch.

4. The method of claim 1 and further comprising:
   receiving from the management module a policy to periodically toggle between the first and second power grids to test the first and second power grids and the grid switch.

5. The method of claim 1 and further comprising:
   transmitting to the management module a status of the first power grid and a status of the second power grid.

6. The method of claim 1 and further comprising:
   if both the first and second power grids are providing power, coupling either the first or second power grids to the power supply based on a default local policy if the management module did not provide a policy.

7. A grid switch comprising:
   inputs for grid A/line 1, grid A/line 2, grid B/line 1, and grid B/line 2;
   outputs for power supply line 1 and power supply line 2;
   a management module connection input;
   a line 1 switch coupled to the grid A/line 1 input, the grid B/line 1 input, and the power supply line 1 output;
   a line 2 switch coupled to the grid A/line 2 input, the grid B/line 2 input, and the power supply line 2 output;
   a grid A AC voltage detection module coupled to the grid A/line 1 input and the grid A/line 2 input;
   a grid B AC voltage detection module coupled to the grid B/line 1 input and the grid B/line 2 input; and
   a grid switch controller coupled to the management module connection input, the line 1 switch, the line 2 switch, the grid A AC voltage detection module, and the grid B AC voltage detection module, wherein the grid switch controller determines if grid A and grid B are providing power via the connections to the grid A and grid B voltage detection modules, and if grid A is providing power and grid B is not providing power, signals the line 1 switch to connect the grid A/line 1 input to the power supply line 1 output and signals the line 2 switch to connect the grid A/line 2 input to the power supply line 2 output, and if grid A is not providing power and grid B is providing power, signals the line 1 switch to connect the grid B/line 1 input to the power supply line 1 output and signals the line 2 switch to connect the grid B/line 2 input to the power supply line 2 output, and if both grid A and grid B are providing power, signaling the line 1 and 2 switches based on a policy provided via the management module connection input if a policy was provided via the management connection input.

8. The grid switch of claim 7 wherein the policy is to select between grids A and B at random.

9. The grid switch of claim 7 wherein the policy is to select between grid A and grid B based on a parameter unique to the grid switch.

10. The grid switch of claim 7 wherein the policy is to periodically toggle between grid A and grid B to test grid A, grid B, and the grid switch.

11. The grid switch of claim 7 and further comprising:
a power monitor coupled to the power supply line 1 and 2 outputs and the grid switch controller, wherein the grid switch controller sends an indication of power flowing through the grid switch out via the management module connection input and receives via the management module connection input a policy to switch to either grid A or grid B based on load balancing metrics.

12. The grid switch of claim 7 wherein the grid switch controller transmits out via the management module connection input a status of grid A and a status of grid B.

13. The grid switch of claim 7 wherein the grid switch controller defines a local default policy if both grid A and grid B are providing power and a policy has not been received via the management module connection.

14. A redundant power configuration for a computer load requiring N power supplies comprising:
first and second power grids;
at least N+1 power supplies coupled to the computer load; and
a grid switch for each power supply, each grid switch coupled to a power supply and the first and second power grids, wherein each grid switch selects an operational power grid from the first and second power grids if one of the first and second power grids has failed, and selects between the first and second grids based on a policy if both the first and second power grids are operational, and
a management module coupled to at least one of the grid switches each grid switch coupled to the management module reports power flowing through the grid switch, and the management module transmits policies to grid switches to distribute loads between the first and second power grids.

15. The redundant power configuration of claim 14 wherein grid switches coupled to the management module report a status of the first power grid and a status of the second power grid to the management module.

16. The redundant power configuration of claim 14 wherein the management module transmits a policy to grid switches from a group of policies comprising selecting a power grid at random, selecting a power grid based on a parameter unique to the grid switch, or toggling between power grids to test power grids and the grid switch.

17. The redundant power configuration of claim 14 wherein the policy is a default local policy selected from a group of policies comprising selecting a power grid at random or selecting a power grid based on a parameter unique to the grid switch.

* * * * *